(12) United States Patent
Sye et al.

(10) Patent No.: US 8,397,399 B2
(45) Date of Patent: Mar. 19, 2013

(54) ADJUSTABLE MEDIA WIDTH SENSOR FOR A MAILING MACHINE

(75) Inventors: Chiping Sye, Stamford, CT (US);
Walter J. Kulpa, Trumbull, CT (US);
Christopher Mallick, Wallingford, CT (US)

(73) Assignee: Pitney Bowes Inc., Stamford, CT (US)

( * ) Notice: Subject to any disclaimer, the term of this patent is extended or adjusted under 35 U.S.C. 154(b) by 341 days.

(21) Appl. No.: 12/643,770

(22) Filed: Dec. 21, 2009

(65) Prior Publication Data

US 2011/0079447 A1 Apr. 7, 2011

Related U.S. Application Data

(60) Provisional application No. 61/247,949, filed on Oct. 1, 2009.

(51) Int. Cl.
*G01B 5/00* (2006.01)
*G01G 19/40* (2006.01)

(52) U.S. Cl. ...................................... 33/783; 177/25.15

(58) Field of Classification Search ...................... 33/783
See application file for complete search history.

(56) References Cited

U.S. PATENT DOCUMENTS

| | | | | |
|---|---|---|---|---|
| 5,154,246 A | * | 10/1992 | DiGiulio et al. | 177/25.15 |
| 5,178,224 A | * | 1/1993 | DiGiulio et al. | 177/25.15 |
| 5,560,595 A | * | 10/1996 | Kulpa | 271/2 |
| 7,882,036 B1 | * | 2/2011 | Yankloski et al. | 705/62 |
| 7,933,846 B2 | * | 4/2011 | Collings et al. | 705/406 |
| 2005/0104274 A1 | * | 5/2005 | Yankloski | 271/10.01 |
| 2006/0192804 A1 | * | 8/2006 | Nakata et al. | 347/16 |
| 2010/0153309 A1 | * | 6/2010 | Asano et al. | 705/407 |
| 2011/0079447 A1 | * | 4/2011 | Sye et al. | 177/25.15 |
| 2011/0140879 A1 | * | 6/2011 | Minckler | 340/501 |
| 2011/0147095 A1 | * | 6/2011 | Sye | 177/25.15 |

* cited by examiner

*Primary Examiner* — Yaritza Guadalupe-McCall
(74) *Attorney, Agent, or Firm* — George M. Macdonald; Charles R. Malandra, Jr.; Steven J. Shapiro

(57) ABSTRACT

An illustrative mailing machine is provided including at least one adjustable optical media width sensor that may be reconfigured for differing postal rating requirements. The media width sensor subassembly has a narrow linear sensor window that is positioned perpendicular to the path of travel of the mail piece. The media width sensor subassembly includes a sensor carriage mount and width measurement scale for facilitating the accurate placement of the adjustable, but secure when placed, sensor carriage. The sensor carriage slidably engages a mount and is spring biased into a locking mechanism in the underside of the media width sensor locating scale.

20 Claims, 6 Drawing Sheets

ADJUSTABLE MEDIA WIDTH SENSOR FOR A MAILING MACHINE

CROSS REFERENCE TO RELATED APPLICATIONS

This application claims priority under 35 U.S.C. section 119(e) from Provisional Patent Application Ser. No. 61/247,949, filed Oct. 1, 2009, entitled Adjustable Media Width Sensor for a Mailing Machine, by Chiping Sye, et al., which is incorporated herein by reference in its entirety.

TECHNICAL FIELD

The illustrative embodiments of the present invention relate generally to new and useful mailing machine width sensors and, more particularly, to new and useful adjustable mailing machine media optical width sensors that may be reconfigured for differing postal rating requirements.

BACKGROUND

Certain mailing machines including certain DM SERIES mailing machines available from Pitney Bowes Inc. of Stamford, Conn. include shape based rating capabilities by which dimensions of a mail piece are used to determine the applicable postal rate. Such mailing machines may include a media width sensor that may include a linear array of optical sensors positioned perpendicular to the path of travel of the mail piece through the mailing machine transport subsystem. The linear array allows the mailing machine to discern many different width breakpoints in measuring the width of the mail piece. However, such a linear array is a relatively expensive subsystem including several sensors in the array such as approximately 25 sensor pairs of optical source and detector. Accordingly, not all mailing machines are equipped with such dimensional rating capability.

Moreover, the sensor locations are fixed and there is a necessary gap between the sensor pairs that are not adjustable. Therefore, the mailing machine measurements may have less accuracy that desired due to the fixed sensor location and relatively large pitch from one sensor to the next.

Accordingly, there is a need for a cost effective, efficient and more accurate sensor subsystem for measuring the width of a mail piece in a mailing machine.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

SUMMARY

Figure 1:
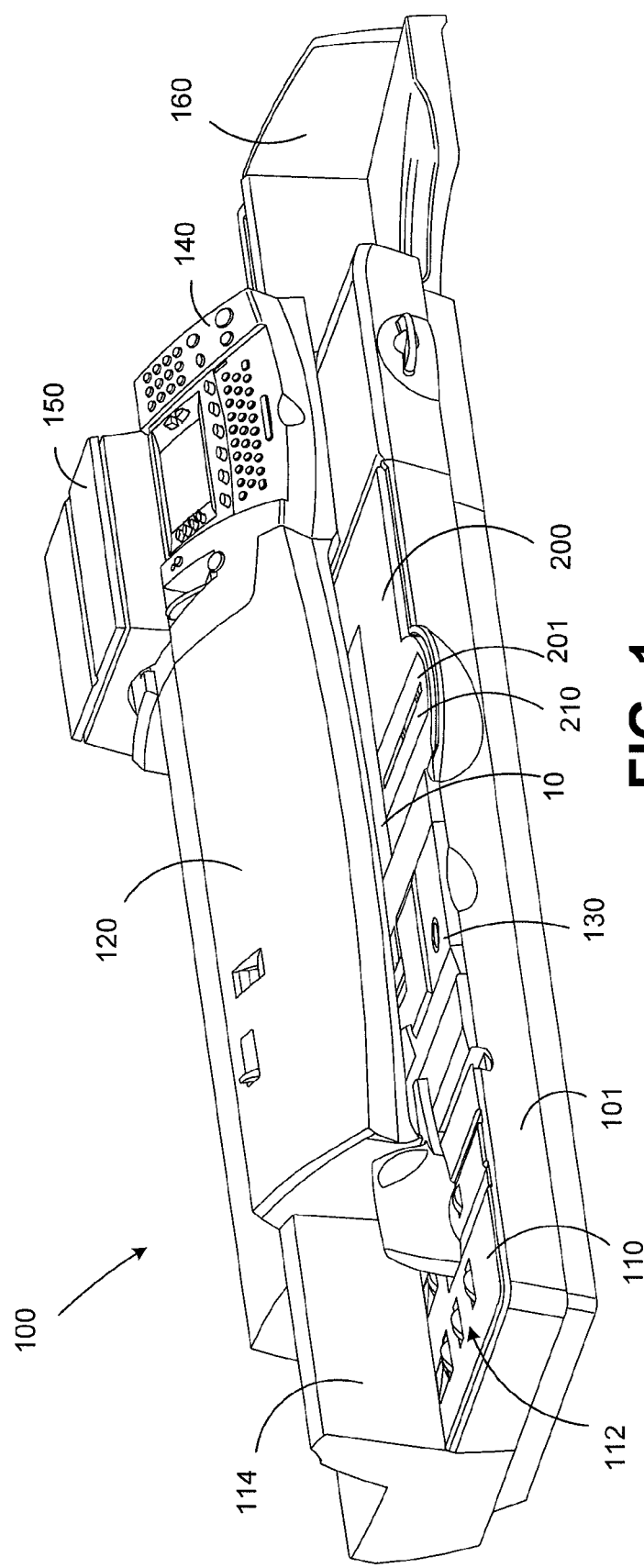
FIG. 1 is a top-front-left perspective view of a mailing machine according to an illustrative embodiment of the present application including an adjustable media width sensor.

An illustrative mailing machine is provided including a media width sensor and more particularly, at least one adjustable optical media width sensor that may be reconfigured for differing postal rating requirements. The media width sensor subassembly has a narrow linear sensor window that is positioned perpendicular to the path of travel of the mail piece. The media width sensor subassembly includes a sensor carriage mount and width measurement scale for facilitating the accurate placement of the adjustable, but secure when placed, sensor carriage.

In one configuration, the sensor carriage slidably engages a mount and is spring biased into a locking mechanism in the underside of the media width sensor locating scale. At least one adjustment member is engaged to depress the sensor carriage mount away from the locking mechanism and downward towards the bottom of the mailing machine so that the sensor carriage may then be slidably moved in the mount front and back in the mailing machine in a direction perpendicular to the path of media travel.

In yet another configuration, two upward biased plungers are provided at each end of the sensor carriage assembly to engage the locking mechanism in the underside of the media width sensor locating scale.

DETAILED DESCRIPTION

The illustrative embodiments of the present application provide new and useful new and useful mailing machine width sensors and, more particularly, to new and useful adjustable mailing machine media optical width sensors that may be reconfigured for differing postal rating requirements.

The illustrative embodiments described herein satisfy at least a need for an inexpensive, efficient and more accurate sensor subsystem for measuring the width of a mail piece in a mailing machine. In one embodiment, a media width sensor is provided with at least one adjustable optical media width sensor that may be reconfigured for differing postal rating requirements. The media width sensor subassembly has a narrow linear sensor window that is positioned perpendicular to the path of travel of the mail piece. The media width sensor subassembly includes a sensor carriage mount and width measurement scale for facilitating the accurate placement of the adjustable, but secure when placed, sensor carriage.

In another embodiment, the sensor carriage slidably engages a mount and is spring biased into a locking mechanism in the underside of the media width sensor locating scale. At least one adjustment member is engaged to depress the sensor carriage mount away from the locking mechanism and downward towards the bottom of the mailing machine so that the sensor carriage may then be slidably moved in the mount front and back in the mailing machine in a direction perpendicular to the path of media travel. In yet another embodiment, two upward biased plungers are provided at each end of the sensor carriage assembly to engage the locking mechanism in the underside of the media width sensor locating scale.

The illustrative embodiments described herein provide an operator or service representative adjustable width sensor mechanism with significantly improved and relatively small measurement increments. The user may easily adjust the width sensor to a new position using a width sensor locating scale to accurately set width measurement breakpoints.

Mailing machines may be configured for use with a particular postal authority, for example, the United States Postal Service (USPS). The same general mailing machine model may also be configured for use with other postal authorities such as the postal authorities in the United Kingdom or France. Certain postal authorities determine the required postage (rating the mail piece) by measuring the weight and or dimensions of the mail piece in conjunction with a class of service and/or destination information.

Accordingly, certain postal authorities utilize shape based rating and require the mailing machine to obtain dimensional information regarding a mail piece. Previous mailing machine width sensors employed a linear array of approximately 25 sensors at fixed positions to provide such width measurement data. While the mailing machine could not measure exact width due to the space between sensors, many breakpoints could be measured using such an array. Accordingly, many postal authority dimensional breakpoints could be accommodated within required tolerances using the sensor with adjustments to the mailing machine software. However, such an array is relatively expensive. Required breakpoints may include three ranges for envelopes narrower than 190 mm, envelopes between 190 mm and 250 mm wide and envelopes greater than 250 mm wide using breakpoints at 1900 mm and 250 mm.

For existing DM SERIES mailing machines that included shape based rating functionality, the systems employed a full sensor array to detect the envelope width information. For example, such an array might provide fixed sensor pairs for every 4 mm pitch in order to detect width information. Such an approach may be effective for a large number of postal breakpoints, but the cost of providing a fixed array with so many sensors is relatively high. Moreover, new postal requirements may be found to require measurements within the 4 mm space between the sensor pairs. Additionally, crosstalk between adjacent sensors adds to the complexity of the sensor array. The illustrative embodiments described herein provide adjustable/movable sensor pairs in carriages that provide at least as small as 1 mm pitch capability. For example, the mailing machine may provide 1, 2, 3 or more sensor pair carriages that may then be adjusted in the sensor assembly to prove at least 1, 2 or 3 respective width measurement breakpoints. Since it is not usually necessary to determine the exact width, but only where the width falls within certain breakpoints, the described embodiments are more cost effective. Moreover, since the carriages can be adjusted with at least as small as 1 mm increments, more accurate breakpoint measurements are possible.

In order to achieve the advantages described above, certain embodiments provide an effective locking mechanism to ensure that the sensor carriage remains in the adjusted position during operation of the mailing machine even when subjected to usual shock and vibration due to operation and or relocation of the system. The width sensor is incorporated into the transport deck mail piece scale and thus the sensor components are part of the tare weight of the system. Two plungers and associated pushing/locking springs are provided with the sensor carriage to lock the width sensors and to avoid unnecessary error due to sensors moving from vibration. Moreover, if the carriage locking system was not relatively very secure, the sensor carriage components could vibrate and since they are part of the scale assembly, such unwanted vibration could cause the scale to delay measurements to wait for vibration dampening. Such reduction in throughput would be undesirable, so a secure sensor carriage locking mechanism is desirable to avoid such unwanted vibration that could result in extra time required for the scale load cell to report an accurate weight. The 1 mm pitch locking teeth mechanism and a position adjustable width sensor provide a more accurate width breakpoint measurement device.

Referring to FIG. 1, a top-front-left perspective view of a mailing machine 100 according to an illustrative embodiment of the present application including an adjustable media width sensor 210 is shown. Mailing machine 100 includes a deck 110 on its base 101 that includes the feeding and other mechanisms. An envelope 10 or other mail piece such as a postcard or flat is loaded at the input side of the feed deck 112. The mailing machine 100 also includes a registration wall 114. The envelope proceeds along the deck generally in a left to right direction from the input side of the feed deck 112 eventually to the output bin/stacker 160. The envelope 10 passes through an envelope flap sealing station 130 and then proceeds though weighing section 200 under the franking print station and then to the output bin 160. The weighing section 200 includes an adjustable optical width sensor subassembly 201 with a cover 210. The mailing machine 100 includes a user interface 140 having a keypad and display. The media path jam clearing cover 120 (the "top cover") may be opened to reveal the feed path and other components (not shown).

Figure 2:
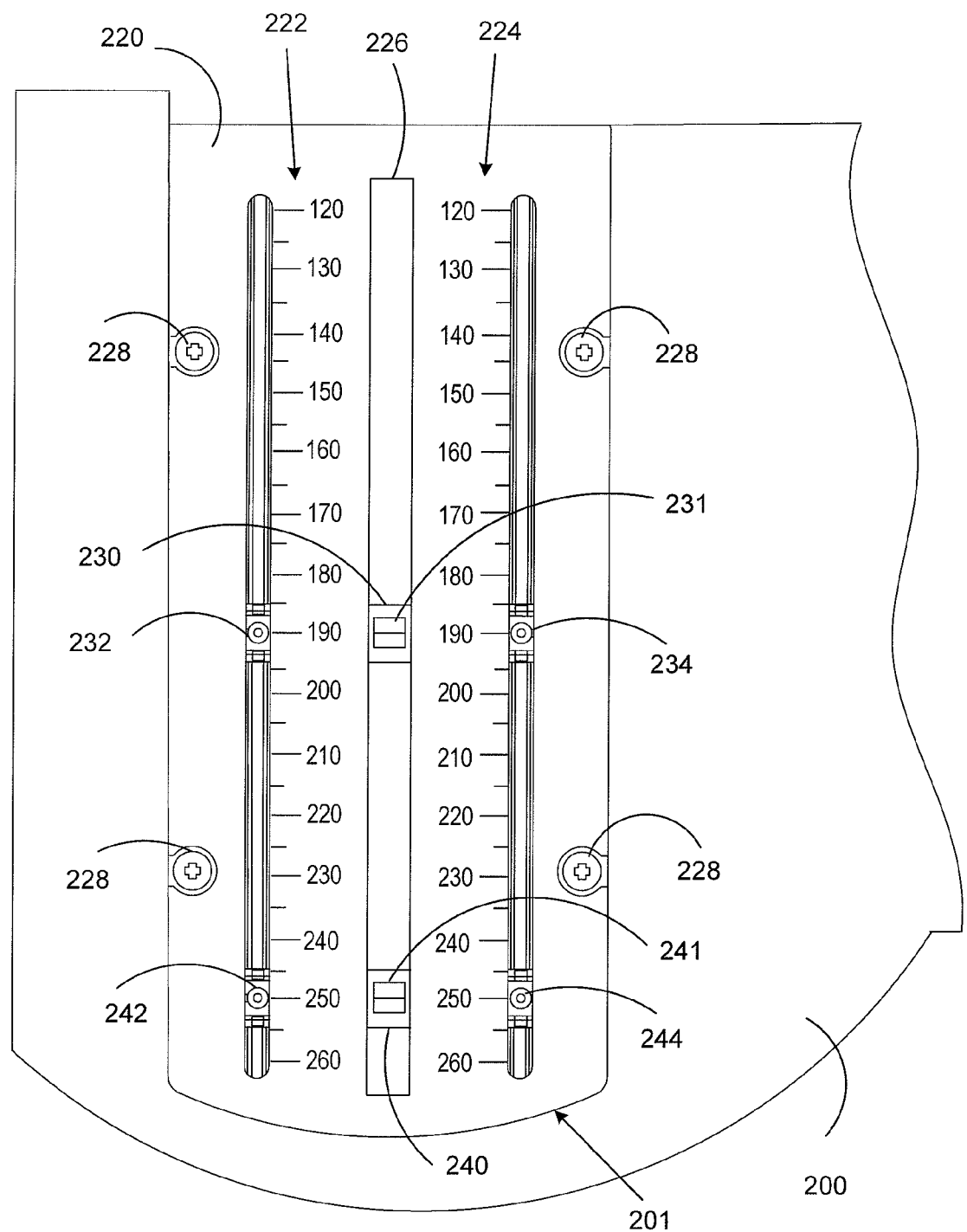
FIG. 2 is a top view of an adjustable width sensor subassembly with the top cover removed according to an illustrative embodiment of the present application.

Referring to FIG. 2, a top view of an adjustable width sensor subassembly 201 with the top cover 210 removed according to an illustrative embodiment of the present application is shown. The adjustable width sensor subassembly 201 is part of the scale subsystem 200. Adjustable width sensor subassembly 201 includes a width sensor lens 220. Sensor lens 220 has a top portion with a left width sensor locating scale 222 and a right width sensor locating scale 224. The sensor lens 220 also includes a width sensor window to allow the optical sensor to operate. The bottom of the sensor lens includes molded teeth used as the top teeth in the sensor carriage locking mechanism. The sensor lens is securely fastened to the subassembly using fasteners 228 such as bolts with locking washers.

At least one movable sensor carriage or sensor frame 230 is provided. In alternatives, 1, 2, 3 or more optical sensor carriages may be provided to set multiple width measurement breakpoints. Here a first carriage 230 is set at width breakpoint 190 mm. The left adjusting point 232 and right adjusting point 234 are provided to facilitate applying downward pressure on the carriage when it is necessary to move the carriage to a new location. For example, the tips of two pens might be used to engage a cup top portion of 232 and 234. The sensor frame or carriage 230 mounts the optical width sensor pair 231 that includes a known optical sensor pair with source and detector. One optical sensor pair device that may be utilized is the GP2S700HCP device available from Sharp Corporation of Osaka, Japan. The sensor circuit includes a connector for a flexible wiring harness to accommodate the adjustable carriage. In this configuration, a second width sensor 241 is provided set at a width breakpoint of 250 mm. The second width sensor carriage also includes a left 242 and a right 244 sensor adjusting points with sensor frame or carriage 240. The sensor pairs operate by passing light through width sensor window 226 that is at least partially translucent to the source and reflected wavelengths.

Figure 3:
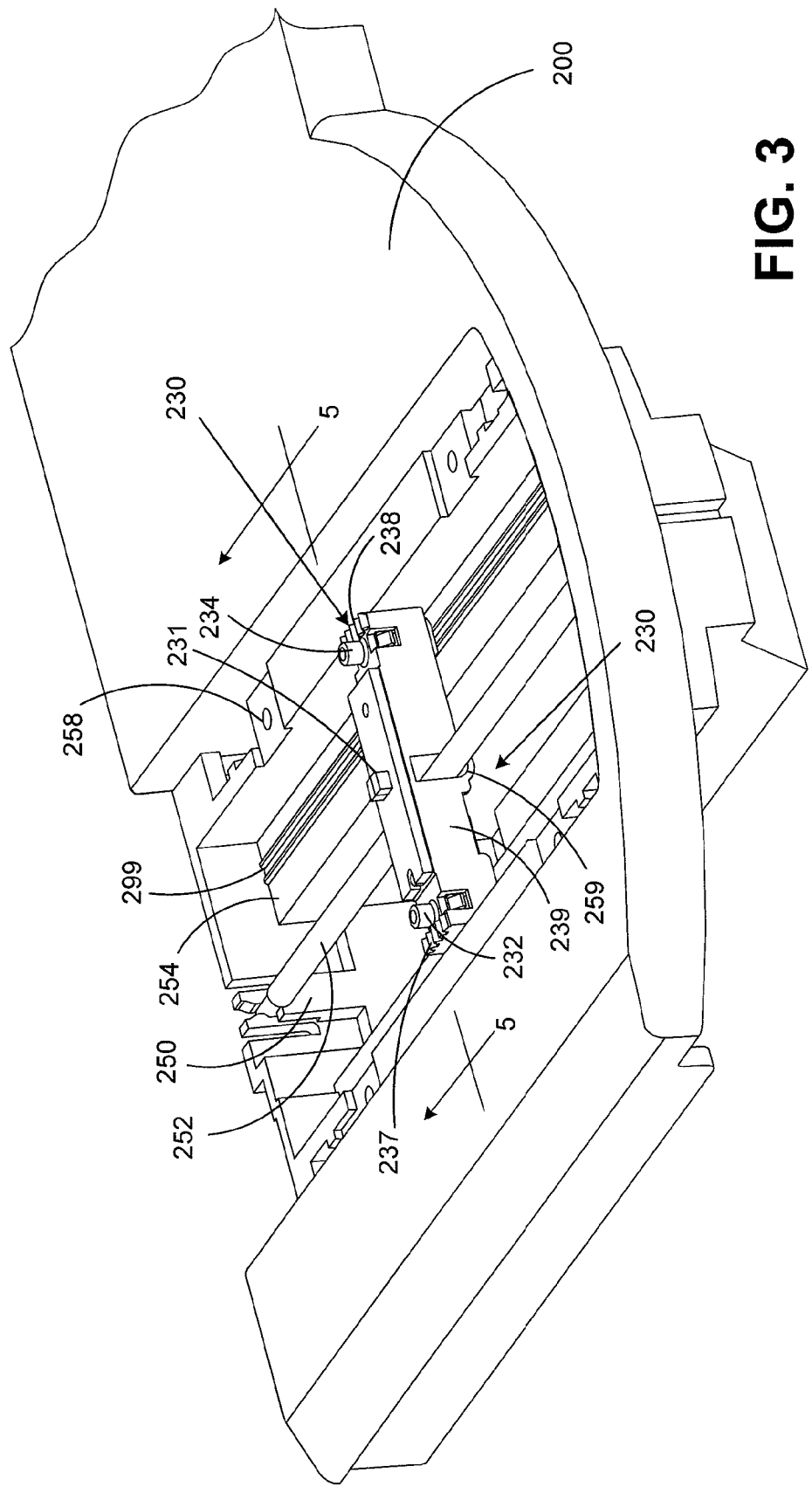
FIG. 3 is a top-front-left perspective view of an adjustable width sensor subassembly with the top cover and the width sensor lens removed according to an illustrative embodiment of the present application.

Referring to FIG. 3, a top-front-left perspective view of an adjustable width sensor subassembly 201 with the top cover 210 and the width sensor lens 220 removed according to an illustrative embodiment of the present application is shown. Here the sensor subassembly 201 provides a base including mounting nuts 258 for securely mounting the lens 220. For sake of clarity, only one sensor frame or carriage 230 is shown. The sensor pair 231 is mounted on a printed circuit board that is mounted to the carriage frame 230. The left adjusting point 232 and right adjusting point 234 are provided to facilitate applying downward pressure on the carriage when it is necessary to move the carriage to a new location along the sensor assembly guide rod 252. The adjusting points may comprise recessed structures such as the cups shown for receiving a narrow biasing implement such as the tip of a pen. For example, two pans may be used to push down the carriage to facilitate moving the carriage to another location. The guide rod 252 is securely mounted in the sensor assembly frame 250. The adjustable optical width sensor carriage 230 may then be adjusted along the guide rod and as supported by the frame 250.

Figure 4:
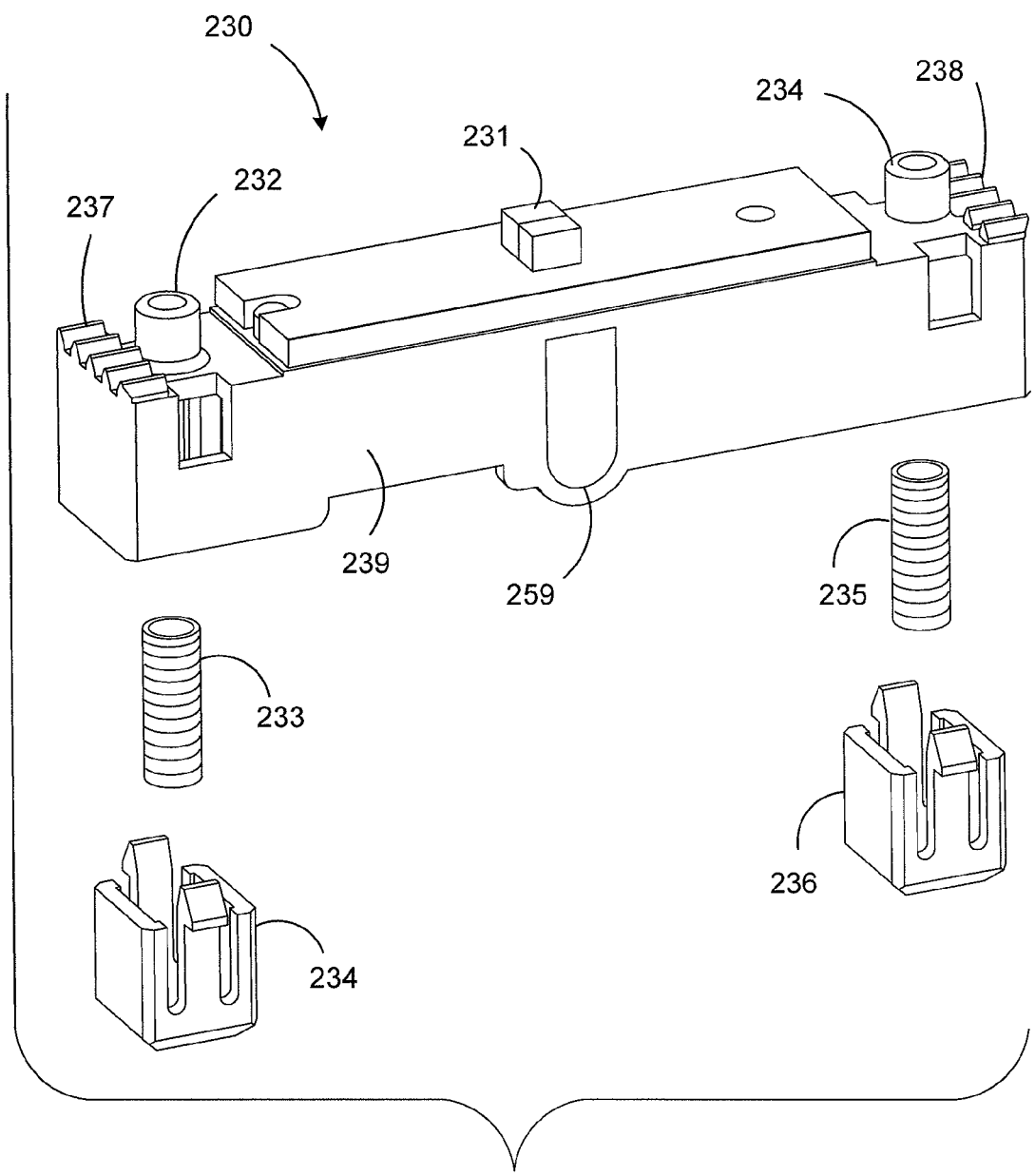
FIG. 4 is a top-front-left exploded perspective view of an adjustable sensor pair assembly according to an illustrative embodiment of the present application.

Referring to FIG. 4, a top-front-left exploded perspective view of an adjustable sensor pair assembly 230 according to an illustrative embodiment of the present application is shown. The sensor pair assembly carriage 230 includes a main frame portion 239 having an opening 259 for slidably engaging the guide rod 252. The frame includes left adjusting point 232 and right adjusting point 234 and includes bottom locking teeth sections 237, 238. The sensor pair 231 is mounted on a printed circuit board that is mounted to the carriage frame 239. Springs 233, 235 and respective plungers 234, 236 that ride along portions of frame 250 provide upward bias for the carriage 230 and teeth 237, 238 to engage the teeth present on the bottom of the lens 220.

The width sensor used in several described embodiments is a reflective type of detector. Here, this type of sensor consists of an infrared emitter and an infrared detector mounted adjacent to and angled toward each other. The intersection of that angle is a point located above the two devices. There is also a wall between the emitter and the detector to prevent the light from the emitter from directly reaching the detector. When there is no object covering the sensor, the light from the emitter radiates outward and does not reach the detector. When an object, such as an envelope covers the sensor, light from the emitter is reflected by the surface of the envelope into the detector. The angle between the emitter and detector along with the power of the emitter and the sensitivity of the detector and the reflectivity of the envelope surface all contribute to determining how close the envelope needs to be to the sensor to be detected. Likewise, if the envelope were right on the surface of the sensor, the wall dividing the emitter from the detector would prevent any emitter light from reaching the detector.

Figure 5:
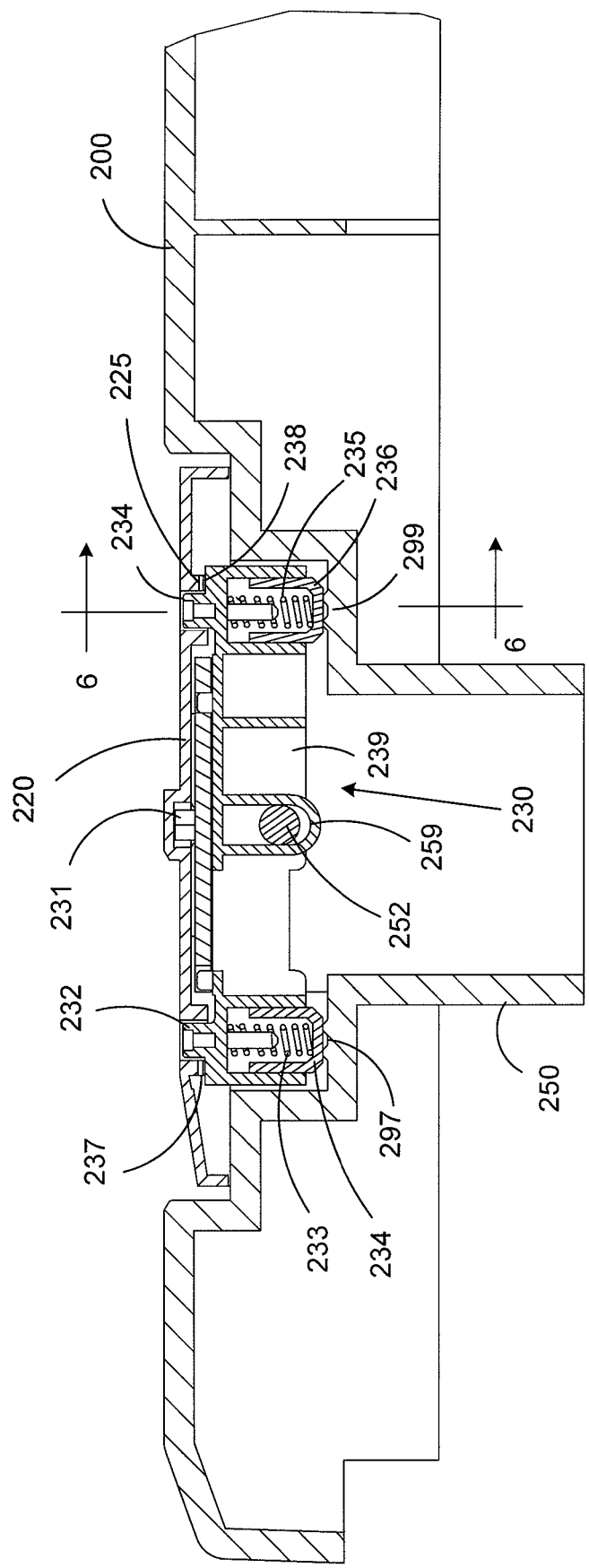
FIG. 5 is a partial sectional view along line 5-5 of the adjustable width sensor subassembly of FIG. 3.

Referring to FIG. 5, a partial sectional view along line 5-5 of the adjustable width sensor subassembly 201 of FIG. 3 is shown. The subassembly 201 is part of the weighing subassembly 200. Subassembly 201 includes mounting frame 250 for supporting guide rod 252 that engages the sensor carriage frame portion 239. The supporting guide rod serves at least two functions. The first function is to locate the sensor assemblies in the left/right and rotational as seen from the top orientations. The second is to limit the vertical translation and front to rear tilt of the sensor assemblies when the lens 220 is not held down by its screws. This function would be used during initial assembly or service removal of the lens for any reason. Without the guide rod to hold the sensor assemblies down, the sensor assembly spring plungers would push the sensor assembly upward and they could fall over when the lens is being moved into place.

The mounting frame 250 includes plunger rails 297, 299 for slidably engaging the respective plungers 234, 236. The frame 239 includes left adjusting point 232 and right adjusting point 234 such as incorporating respective posts for engaging springs 233, 235 in respective plungers 234, 236. The frame 239 includes bottom locking teeth sections 237, 238 for engaging the top teeth sections on the bottom of lens 220. The lens 220 used in this embodiment provides a smooth surface that allows an envelope lead edge to pass over the sensors without stubbing. It also protects the sensors from abrasive wear and paper dust accumulations. However, since it creates surfaces that can reflect the infrared light from the emitter to the detector, its location between the sensor and the envelope is important. The lens surface closest to the sensor must be close enough so that it does not reflect emitter light into the detector. Actual contact between these two surfaces is ideal but impractical. As shown in FIG. 5, the device according to this embodiment registers the sensor assembly upward against the inner surface of the lens which minimizes the number of dimensions between the surface of the sensor and the inner surface of the lens 220. Since the lens must be a minimum thickness for molding and mechanical strength purposes, being able to position the surface of the sensor extremely close to the lens inner surface allows the short detecting distance of the sensor to be met along with the lens thickness requirements.

Figure 6:
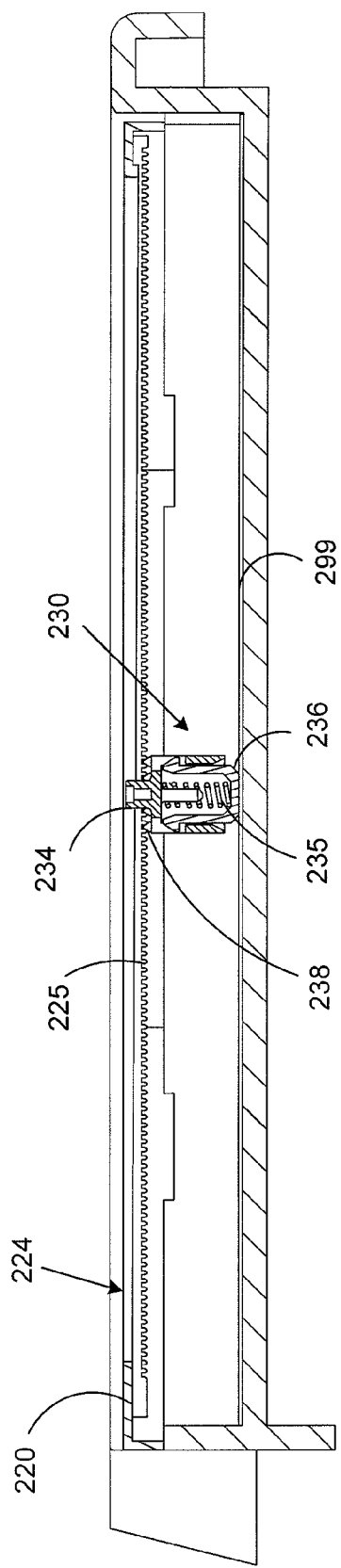
FIG. 6 is a partial sectional view along line 6-6 of the adjustable width sensor subassembly of FIG. 5.

Referring to FIG. 6, a partial sectional view along line 6-6 of the adjustable width sensor subassembly 201 of FIG. 5 is shown. Lens 220 includes locating scale 224 and a bottom surface that includes the top teeth 225 providing the sensor locating teeth used to fix the sensor assembly 230 at the appropriate location. Adjusting point 234 is used to depress biasing spring 235 to disengage teeth 238 from teeth 225 when it is necessary to move the carriage. The underside of the lens is textured to provide contrast to the scale on the upper surface.

In an alternative embodiment, the scale 200 is displaced in a separate unit that may be connected inline in the paper path of a mailing machine such as a large multi-unit mail creation system such as a SERIES 9 inserter available from Pitney Bowes Inc. Alternatively, the scale 200 may be used in a standalone scale such as a platform rating scale that incorporated optical dimensional rating. Accordingly, in alternative embodiments, the scale provides an adjustable media width sensor assembly for optically measuring a media dimension such as measuring the width of a mail piece such as an envelope. In yet another alternative embodiment, the scale does not provide a measured weight of the article, but rather only provides a dimensional measurement.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A mailing machine having an adjustable media width sensor assembly comprising;
   a scale assembly including an adjustable media width sensor frame,
   a mounting assembly operatively connected to the adjustable media width sensor frame, and
   at least one adjustable optical width sensor carriage operatively connected to the adjustable media width sensor frame.

2. The mailing machine of claim 1, further comprising a width sensor lens operatively connected to the adjustable media width sensor frame, wherein,
   the width sensor lens includes a first locking mechanism portion, and
   the at least one adjustable optical width sensor carriage operatively connected to the adjustable media width sensor frame includes a second locking mechanism portion for engaging the first locking mechanism portion.

3. The mailing machine of claim 2, wherein,
   the at least one adjustable optical with sensor carriage is biased toward the width sensor lens.

4. The mailing machine of claim 3, wherein,
   the at least one adjustable optical with sensor carriage is biased toward the width sensor lens by a plurality of springs.

5. The mailing machine of claim 3, wherein,
   the at least one adjustable optical with sensor carriage includes at least two recessed structures to receive a narrow biasing implement.

6. The mailing machine of claim 2, wherein,
   the first locking mechanism portion and the second locking mechanism portion comprise respective locking teeth.

7. The mailing machine of claim 2, wherein,
   the at least one adjustable optical width sensor carriage includes an opening for slidably engaging a guide rod operatively connected to the adjustable media width sensor frame.

8. The mailing machine of claim 1, wherein,
   the at least one adjustable optical width sensor carriage includes at least two adjustable optical width sensor carriages.

9. The mailing machine of claim 1, further comprising:
   a lens displaced above the at least one adjustable optical with sensor carriage, wherein a top surface of the lens is mounted adjacent to a lens cover, wherein the top surface of the lens cover is mounted flush with a top transport surface of the scale assembly.

10. The mailing machine of claim 9, wherein,
    the sensor lens includes a distance scale measuring distance from a registration wall of the mailing machine.

11. A scale having an adjustable media width sensor assembly for optically measuring a dimension comprising;
    a scale assembly including an adjustable media width sensor frame,
    a mounting assembly operatively connected to the adjustable media width sensor frame, and
    at least one adjustable optical width sensor carriage operatively connected to the adjustable media width sensor frame.

12. The scale of claim 11, further comprising a width sensor lens operatively connected to the adjustable media width sensor frame, wherein,
    the width sensor lens includes a first locking mechanism portion, and
    the at least one adjustable optical width sensor carriage operatively connected to the adjustable media width sensor frame includes a second locking mechanism portion for engaging the first locking mechanism portion.

13. The scale of claim 12, wherein,
    the at least one adjustable optical with sensor carriage is biased toward the width sensor lens.

14. The scale of claim 13, wherein,
    the at least one adjustable optical with sensor carriage is biased toward the width sensor lens by a plurality of springs.

15. The scale of claim 13, wherein,
    the at least one adjustable optical with sensor carriage includes at least two recessed structures to receive a narrow biasing implement.

16. The scale of claim 12, wherein,
    the first locking mechanism portion and the second locking mechanism portion comprise respective locking teeth.

17. The scale of claim 12, wherein,
    the at least one adjustable optical width sensor carriage includes an opening for slidably engaging a guide rod operatively connected to the adjustable media width sensor frame.

18. The scale of claim 11, wherein,
    the at least one adjustable optical width sensor carriage includes at least two adjustable optical width sensor carriages.

19. The scale of claim 11, further comprising:
    a lens displaced above the at least one adjustable optical with sensor carriage, wherein a top surface of the lens is mounted adjacent to a lens cover, wherein the top surface of the lens cover is mounted flush with a top transport surface of the scale assembly.

20. The scale of claim 19, wherein,
    the sensor lens includes a distance scale measuring distance from a registration wall of the mailing machine.

* * * * *